(12) United States Patent
Kondrad et al.

(10) Patent No.: US 12,395,607 B2
(45) Date of Patent: Aug. 19, 2025

(54) COMMUNICATION SYSTEM, VEHICLE FOR USE WITH SAME, AND ASSOCIATED METHOD

(71) Applicant: Ford Global Technologies, LLC, Dearborn, MI (US)

(72) Inventors: Marcos Silva Kondrad, Macomb Township, MI (US); Kevin Wayne Preuss, Berkley, MI (US); Kevin Mozurkewich, Milford, MI (US); Patrick Maloney, Livonia, MI (US); Trevor White, Southgate, MI (US)

( * ) Notice: Subject to any disclaimer, the term of this patent is extended or adjusted under 35 U.S.C. 154(b) by 317 days.

(21) Appl. No.: 18/172,197

(22) Filed: Feb. 21, 2023

(65) Prior Publication Data
US 2024/0283895 A1    Aug. 22, 2024

(51) Int. Cl.
| H04N 7/14 | (2006.01) |
| G06F 3/14 | (2006.01) |
| H04N 7/15 | (2006.01) |
| H04N 7/18 | (2006.01) |
| H04W 4/46 | (2018.01) |

(52) U.S. Cl.
CPC .......... *H04N 7/142* (2013.01); *G06F 3/1423* (2013.01); *H04N 7/14* (2013.01); *H04N 7/15* (2013.01); *H04N 7/181* (2013.01); *H04W 4/46* (2018.02)

(58) Field of Classification Search
None
See application file for complete search history.

(56) References Cited

U.S. PATENT DOCUMENTS

| 8,676,920 | B2 | 3/2014 | Bai et al. | |
| 10,049,419 | B1* | 8/2018 | Marron | A61B 5/082 |
| 10,708,542 | B1* | 7/2020 | Griffin | H04W 4/40 |
| 10,952,054 | B2 | 3/2021 | Bajwa et al. | |
| 11,240,647 | B2 | 2/2022 | Watfa et al. | |
| 2002/0032048 | A1* | 3/2002 | Kitao | H04N 7/148 |
| | | | | 348/E7.079 |
| 2003/0231238 | A1* | 12/2003 | Chew | H04N 7/15 |
| | | | | 348/E7.083 |
| 2015/0304604 | A1* | 10/2015 | Sharma | H04N 21/42203 |
| | | | | 348/14.02 |
| 2021/0297472 | A1 | 9/2021 | Calvert et al. | |
| 2022/0247971 | A1* | 8/2022 | McNelley | H04N 7/144 |
| 2023/0093198 | A1* | 3/2023 | Szelest | G06V 20/41 |
| | | | | 709/204 |

OTHER PUBLICATIONS

Tom H. Luan et al., Social on the Road: Enabling Secure and Efficient Social Networking on Highways, IEEE Wireless Commuuncations, Feb. 2015.
Huan Li et al., Veshare: A D2D Infrastructure for Real-Time Social-Enabled Vehicle networks, IEEE Wireless Communications, Aug. 2016.

* cited by examiner

*Primary Examiner* — Quoc D Tran
(74) *Attorney, Agent, or Firm* — Emily Drake; Eversheds Sutherland (US) LLP

(57) ABSTRACT

A communication system and associated methods are provided. The communication system and associated methods includes a vehicle having an interior for seating a number of individuals, a camera coupled to the interior, and a display screen coupled to the interior. The communication system further includes an apparatus having a camera and a display screen. The camera of the vehicle is wirelessly connected to the display screen of the apparatus. The camera of the apparatus is wirelessly connected to the display screen of the vehicle.

15 Claims, 11 Drawing Sheets

COMMUNICATION SYSTEM, VEHICLE FOR USE WITH SAME, AND ASSOCIATED METHOD

BACKGROUND

Oftentimes, when at least one person is being transported in a vehicle, it is desirable for that person to be able to communicate with others not in the vehicle. Further yet, it is desirable for this communication to resemble face to face communication as much as possible. For example, when large numbers of people need to be transported from one location to another, it is common that they will not all be able to fit in one vehicle. As such, these groups of people may need to split up and take two separate vehicles. This detracts from the sense of community and connection that the group has. Not being in the same physical presence as someone else may, in another example, inhibit the ability to make social connections between the parties.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
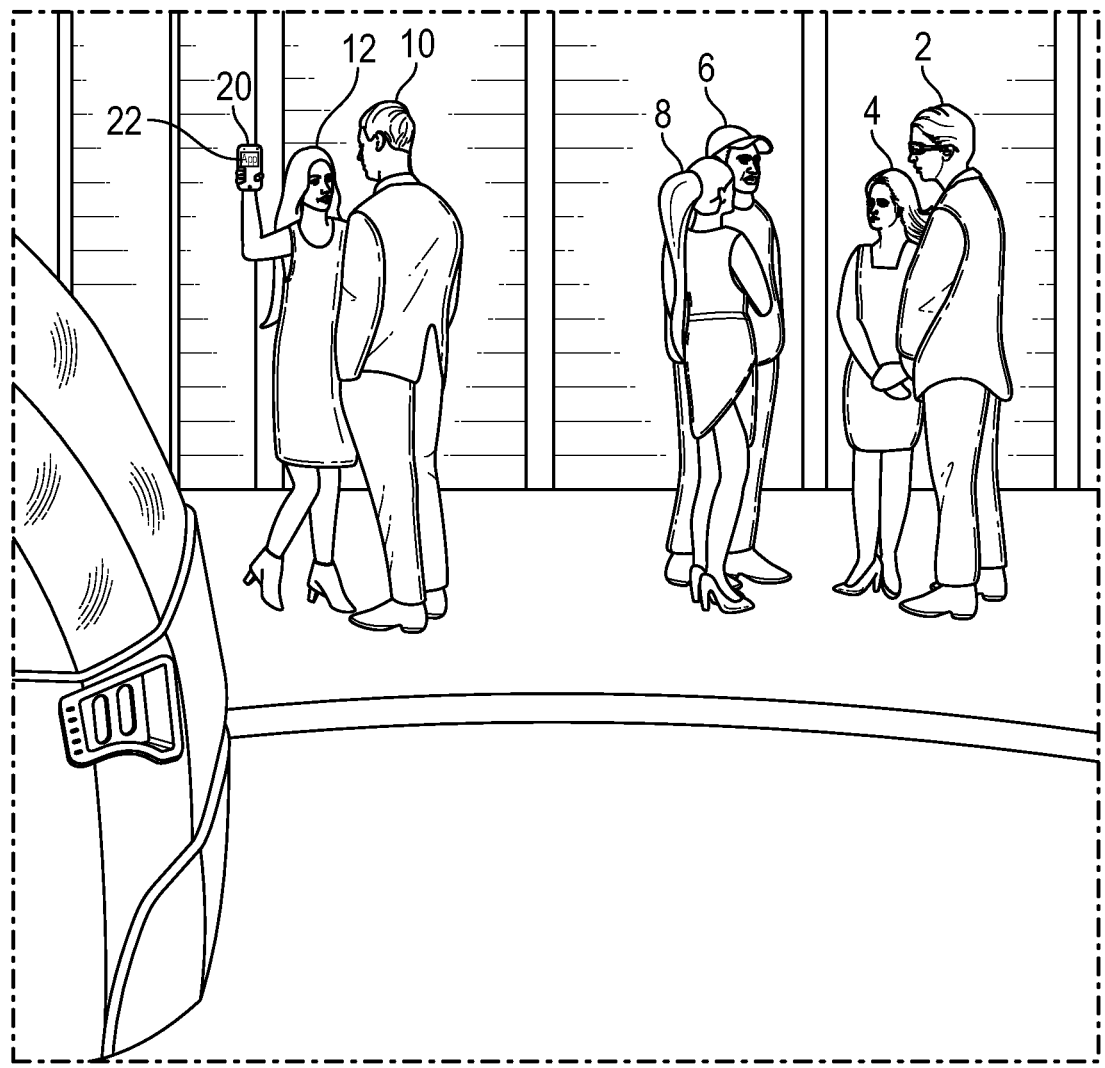
FIG. 1 shows a number of individuals, with one of the individuals using a mobile device, in accordance with one non-limiting embodiment of the disclosed concept.

The systems, apparatuses, and methods disclosed herein assist in part in providing desirable communication between individuals who are not in the same physical space. For example, in one embodiment individuals cannot all fit into the same vehicle. However, systems in accordance with the disclosed concept allow individuals in one vehicle to communicate with individuals in another vehicle. They do this by providing the vehicles, which may be fully autonomous taxis, with two-way audio-visual capabilities such that individuals in one vehicle can hear and see individuals in another vehicle.

Each of the vehicles disclosed herein may include one or more computing devices, controllers, processors and memory, modules, and/or software or the like configured to execute the various systems and methods disclosed herein. Each vehicle also may include one or more transceivers or the like configured to communicate with other vehicles directly or over a network. The vehicles may also communication with one or more computing devices (e.g., mobile devices) associated with one or more users directly or over a network. The vehicles and the user computing devices may also communication with one or more services providers (e.g., a ride hail service or the like) associated with the vehicles directly or over a network.

In one instance, the two-way audio-visual communication includes display screens, cameras, and audio sensors. The display screens may be configured to display life size representations of the interior of the vehicles provided by cameras in those other vehicles. The audio sensors may be positioned proximate the display screen which displays the image of an individual from which the audio source is emanating. Thus, individuals in one vehicle can see life size representations of other individuals on display screens and hear their voices as if they were physically in the same space. As a result, individuals in separate vehicles can enjoy substantially the same type of communication as if they were all in the same physical space.

In another instance, systems, apparatuses, and methods in accordance with the disclosed concept provide communication systems that include vehicles and, for example, mobile devices. In these instances, individuals in a vehicle can communicate with individuals who are not in the same physical space, and who are not in another vehicle. Rather, the individuals in the vehicle can communicate with individuals in any other physical space via two-way audio-visual links between the vehicle and the mobile device.

One scenario where such a communication system is desirable is where an elderly person (or any other person) is being driven in a vehicle, which may be a fully autonomous taxi. The elderly person may be being driven to a hospital or to a doctor's office for an appointment. Rather than having the elderly person ride in a vehicle by himself or by herself, the communication system provided herein allows the elderly person to have two-way audio-visual communication with an individual who is not physically present in the vehicle. This may allow a relative employing a mobile device to continue to talk to the elderly person during the trip to the hospital or doctor's office. Additionally, as the display screens are configured to display life size representations, the relative, who might be at home, can be displayed in a life size manner, thus further comforting the individual being transported.

Another scenario where such a communication system is desirable is where one individual is riding in a vehicle, such as a fully autonomous taxi, and a separate concierge can communicate with the individual via display screens, camera, and/or audio sensors. The individual can thus be provided with the advantages of having a concierge present in the vehicle as if the two were in the same physical space.

These and other advantages of the present disclosure are provided in greater detail herein.

Illustrative Embodiments

As employed herein, the term "number" shall mean one or an integer greater than one (i.e., a plurality).

As employed herein, the term "coupled" shall mean connected either directly or through one or more intermediate parts or components.

As employed herein, the term "camera" shall mean an optical instrument that can capture an image, including 2D and 3D images. Cameras in accordance with disclosed concept capture moving images and convert them into electronic signals so that they can be saved on a storage device, such as a videotape or a hard drive, or viewed on a monitor.

As employed herein, the term "display screen" shall mean a device capable of representing information visually, as on a cathode-ray tube screen. Display screens in accordance with the disclosed concept include visual output devices that present information in a visible form. The information displayed can be an image (stationary or moving), text, or graphics.

As employed herein, the term "audio sensor" shall mean a module that detects sound waves through its intensity and converts it to electrical signals. Audio sensors may employ a microphone, peak detector, and an amplifier to notice sound and process an output voltage signal to a microcontroller. Audio sensors in accordance with the disclosed concept include two-way audio sensors, wherein sound can flow into and out of the audio sensor.

As employed herein, the term "interior" shall mean inside structural surfaces of a vehicle, including walls, ceilings, floors, and seats of the vehicle.

FIG. 1 shows a view of a plurality of individuals (e.g., six individuals 2,4,6,8,10,12) standing around socializing. As stated above, the current state of the art requires communication between individuals in large numbers to be inhibited when they are transported, such as when they split up to take multiple taxis. However, the disclosed concept provides a solution to this drawback in the art.

Figure 2:
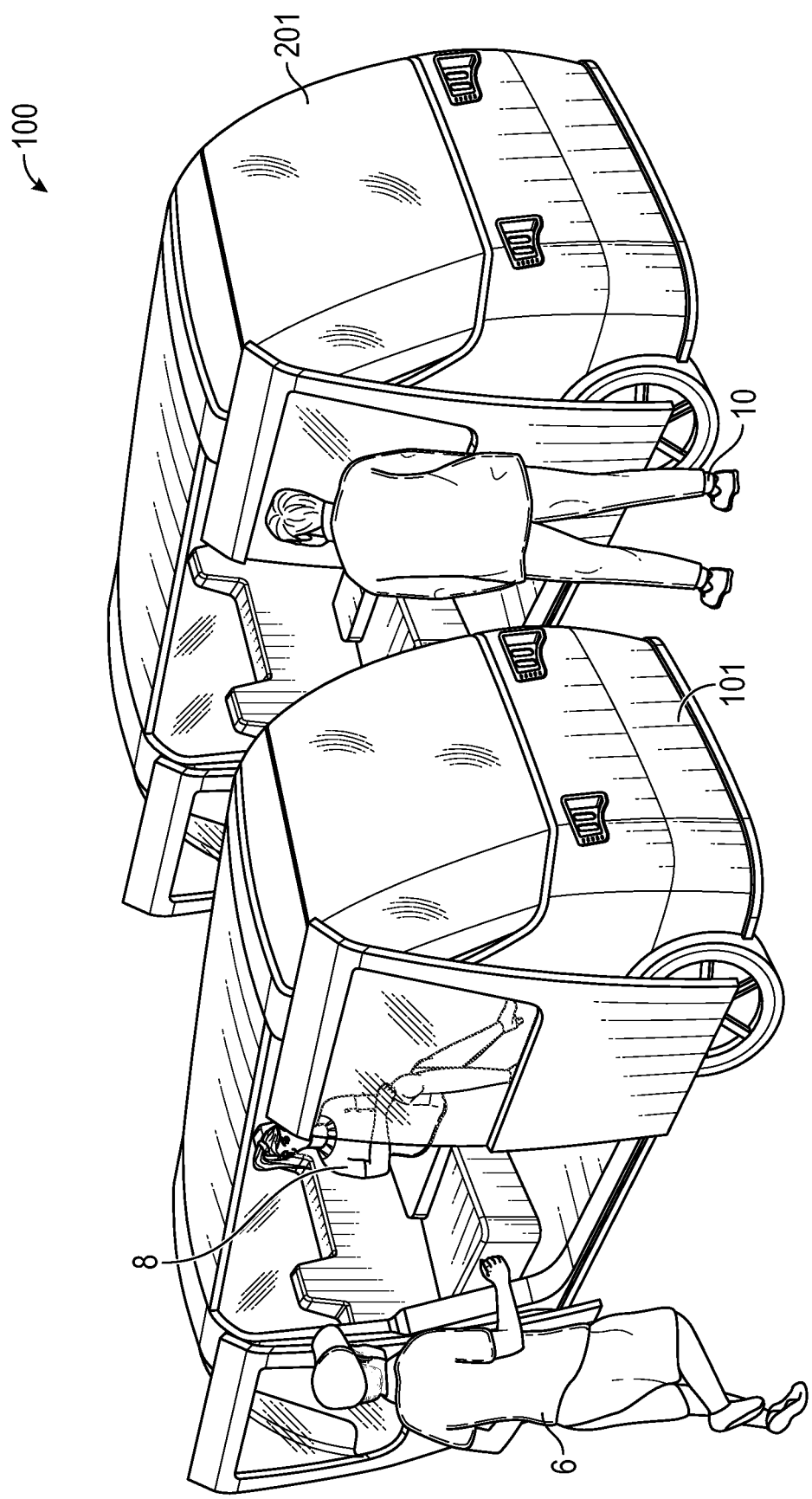
FIG. 2 shows a communication system for use with the number of individuals of FIG. 1, in accordance with one non-limiting embodiment of the disclosed concept.

More specifically, FIG. 2 shows an example communication system 100 that is advantageously configured to allow the individuals (only three of the individuals 6,8,10 are shown in FIG. 2) to substantially maintain the level of communication that they enjoyed in the position shown in FIG. 1. As shown, the communication system 100 includes first and second apparatus in the form of vehicles 101,201. Although generally illustrated as fully autonomous taxis, the vehicles 101,201 may take the form of another passenger or commercial automobile such as, for example, a performance vehicle, a car, a truck, a crossover vehicle, a van, a minivan, a sport utility vehicle, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. Example drive systems can also include electric and hybrid systems.

Further, the vehicles 101,201 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Figure 3:
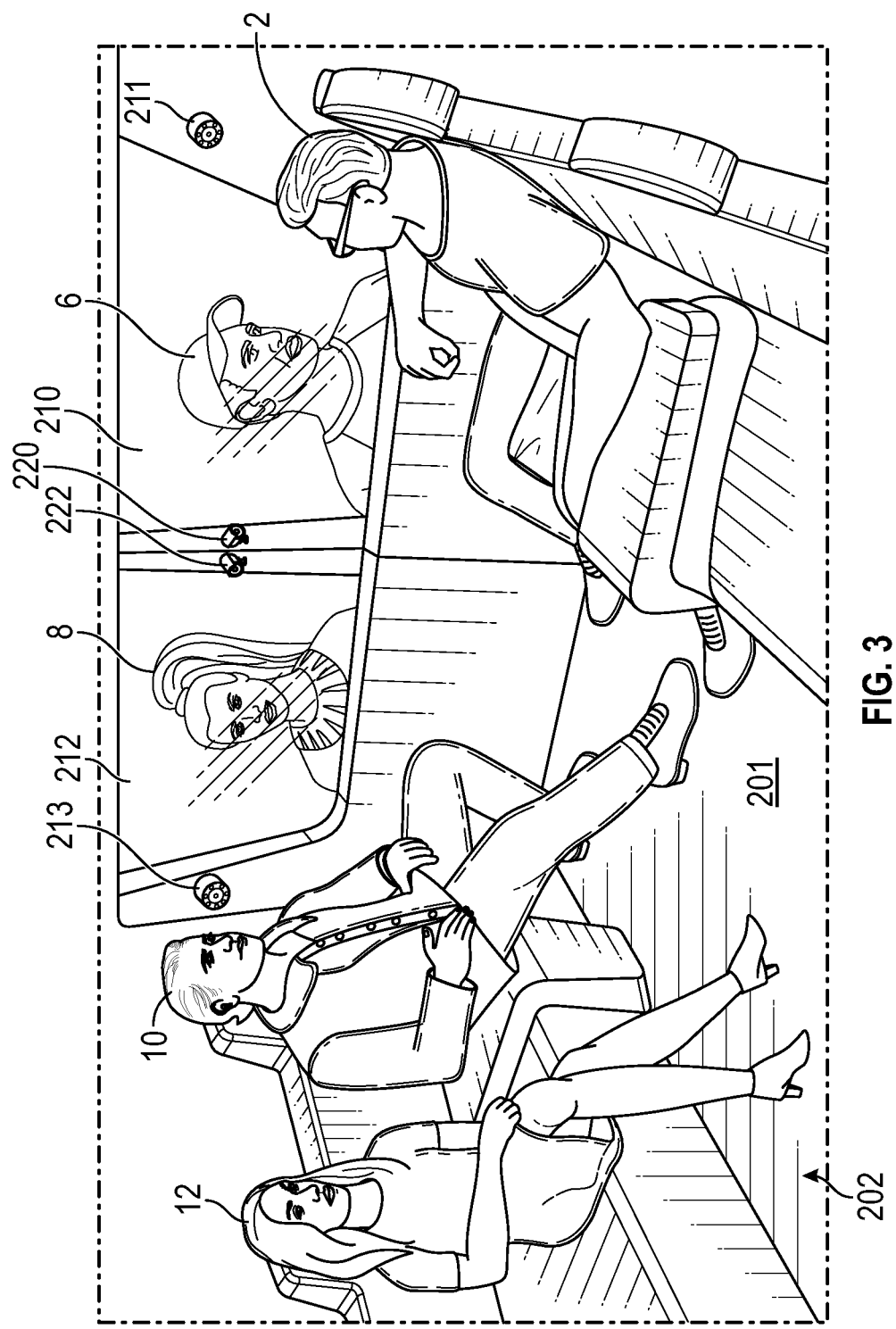
FIG. 3 shows a portion of a vehicle for the communication system of FIG. 2, and is shown with some of the individuals of FIGS. 1 and 2.

FIG. 3 shows an interior 202 of the vehicle 201. As shown, the interior 202 has a number of seats for seating the individuals 2,10,12. Additionally, coupled to the interior 202 are a number of display screens 210,212 and a number of cameras 220,222. As shown, displayed in each of the display screens 210,212 is an image of a corresponding one of the individuals 6,8. It will be appreciated that the individuals 6,8 may be located in the other vehicle 101 of the communication system 100. See, for example, FIG. 4, which shows an interior 102 of the other vehicle 101 that was depicted in FIG. 2.

Figure 4:
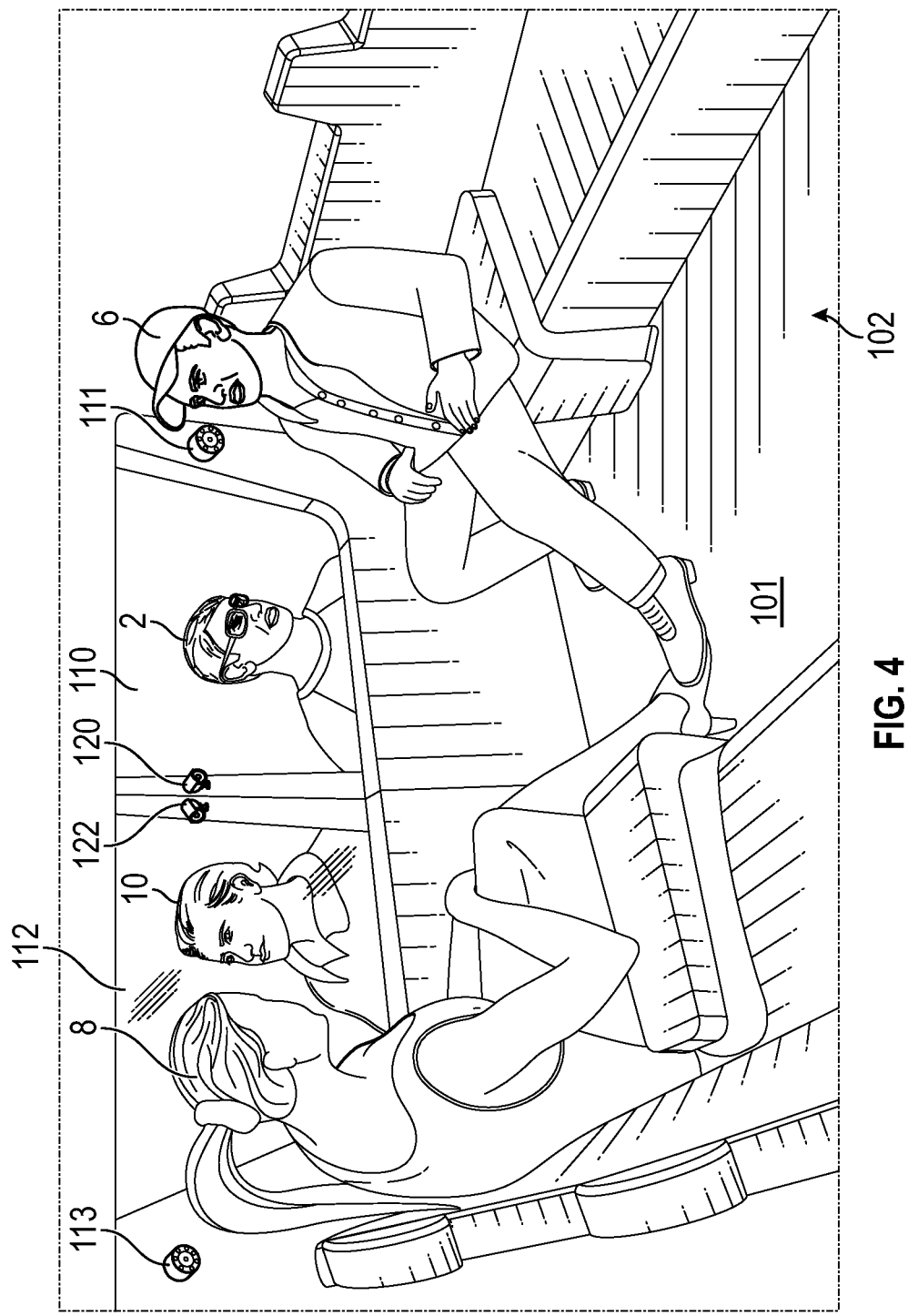
FIG. 4 shows a portion of another vehicle for the communication system of FIG. 2, and is shown with some of the individuals of FIGS. 1 and 2.

As shown in FIG. 4, the interior 102 of the vehicle 101 has a number of seats for seating the individuals 6,8. The vehicle 101, like the vehicle 201, also has a number of display screens 110, 112 and a number of cameras 120, 122 each coupled to the interior 202. Although the vehicles 101,201 have each been described in association with each having two display screens 110,112,210,212 and two cameras 120, 122,220,222, it will be appreciated that any suitable alternative number of display screens and cameras may be coupled to the interiors 102,202, as will be described below in association with FIGS. 5-7, without departing from the scope of the disclosed concept.

Additionally, as shown in FIGS. 3 and 4, the display screens 110,112,210,212 are configured to display life size representations of the interiors 102,202 of the vehicles 101,201 provided by the cameras 120,122,220,222. See, for example, FIG. 3, wherein the display screens 210,212 display life size representations of the individuals 6,8. In other words, the actual physical dimensions of the individuals 6,8 shown in FIG. 4 are the same as the actual dimensions of the images of the individuals displayed on the display screens 210,212, shown in FIG. 3. As such, the cameras 120,122 receive images of the individuals 120,122, associate dimensions with those images, and the associated dimensions are provided to the display screens 210,212. In one example embodiment, the dimensions are provided exactly to the display screens 210,212 without distortion.

Continuing to refer to FIG. 3, it will thus be appreciated that the individuals 2,10,12 can advantageously maintain substantially the same degree of communication with the individuals 6,8 that they enjoyed when they were all in the same physical vicinity. This is easier on the eyes of the individuals 2,10,12, thus making communication more seamless and less stressful.

Moreover, in one example embodiment, the vehicles 101,201 each further include a number of audio sensors 111,113,211,213 each coupled to a corresponding one of the interiors 102,202 and each positioned proximate (e.g., adjacent) and electrically connected to a corresponding one of the display screens 110,112,210,212. Additionally, and continuing to refer to FIG. 3, audio from the individual 6 in the display screen 210 emanates out of the audio sensor 211, and audio from the individual 8 in the display screen 212 emanates out of the audio sensor 213. The vehicle 101 in FIG. 4 is similarly structured like the vehicle 201. Furthermore, as the individuals 2,10 are positioned proximate the corresponding audio sensors 211,213, it will be appreciated that audio from these individuals will most readily enter the corresponding audio sensors 211,213. Stated differently, the seat of the individual 10 is generally between the speaker 213 and the seat of the individual 12. This allows the individual 8 to more easily be heard by the individual 10 than the individual 12, e.g., as if the individuals 8,10 were standing next to each other.

Accordingly, the communication system 100 of the disclosed concept advantageously provides a two-way audio-visual link between the vehicles 101,201. Additionally, and continuing to refer to FIG. 3, as the audio sensors 211,213 are positioned proximate the corresponding display screens 210,212, the audio-visual link may seem as if the individuals 6,8 are in the same physical space as the corresponding individuals 2,10 or are positioned right next to them. This is desirable for maintaining a sense of connection between the individuals 2,6,8,10,12 when they are not all in the same physical space. It can also reduce the likelihood that there will be emotional distress for any of the individuals 2,6,8,10,12 trying to communicate with others who are not in the same physical space.

In one example embodiment, the audio-visual link between the vehicles 101,201 is provided by an app on an external device. See FIG. 1, for example, which shows the individual 12 employing an external device (e.g., mobile phone 20) having an app 22. The app 22 may be employed to wirelessly connect the display screens 210,212 of the vehicle 201 to the cameras 120, 122 of the vehicle 101, and to wirelessly connect the display screens 110,112 of the vehicle 101 to the cameras 220,222 of the vehicle 201. Accordingly, the mobile phone 20 may be communicatively coupled with the vehicles 101,201 via one or more network (s), which may communicate via one or more wireless connection(s), and/or may connect with the vehicles 101,201 directly using near field communication (NFC) protocols, Bluetooth® protocols, Wi-Fi, Ultra-Wide Band (UWB), and other possible data connection and sharing techniques. In other example embodiments, other mechanisms besides the app 22 may be employed to provide suitable wireless connections between the display screens 110,112,210,212 and the cameras 120,122,220,222.

Figure 5:
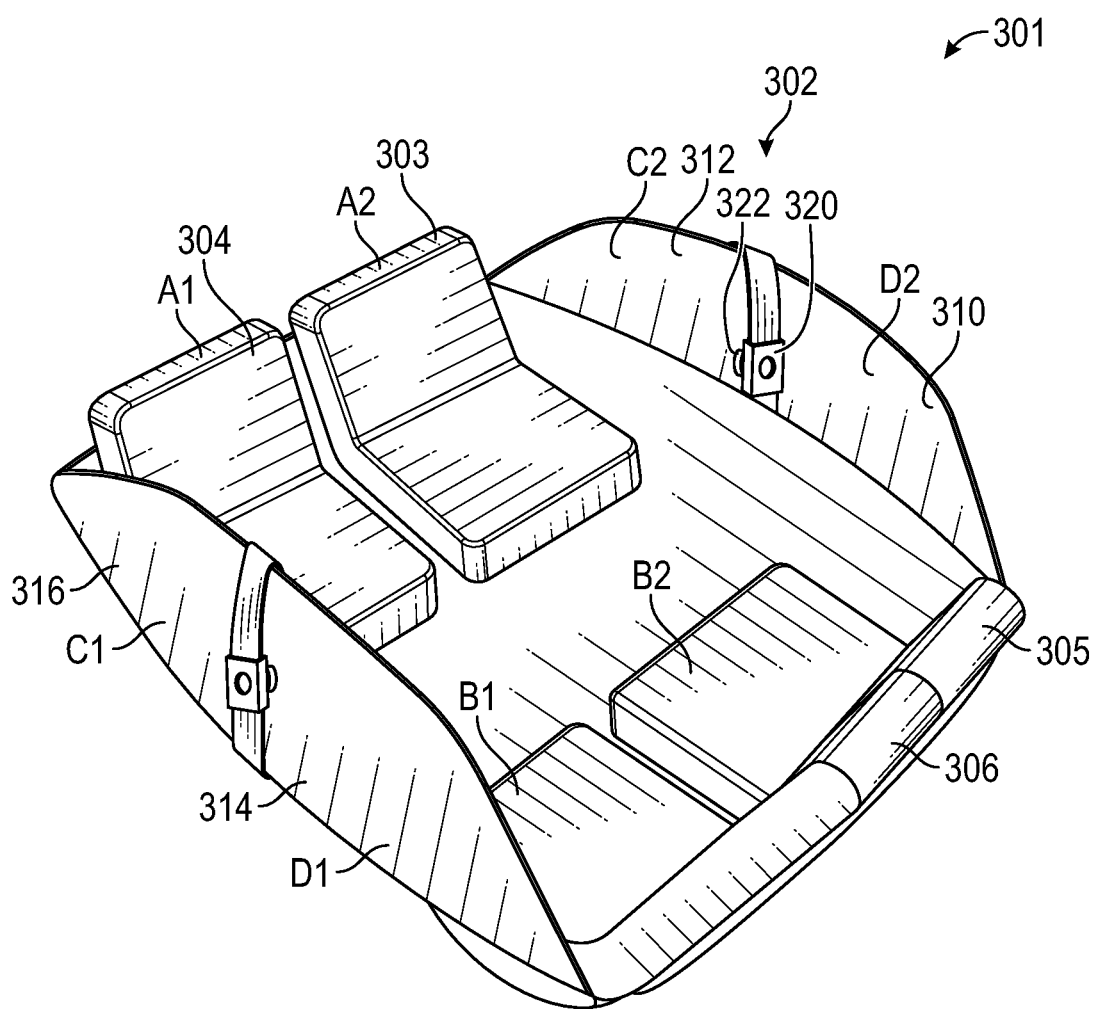
FIG. 5 shows a portion of another vehicle for another communication system, in accordance with another non-limiting embodiment of the disclosed concept.
Figure 6:
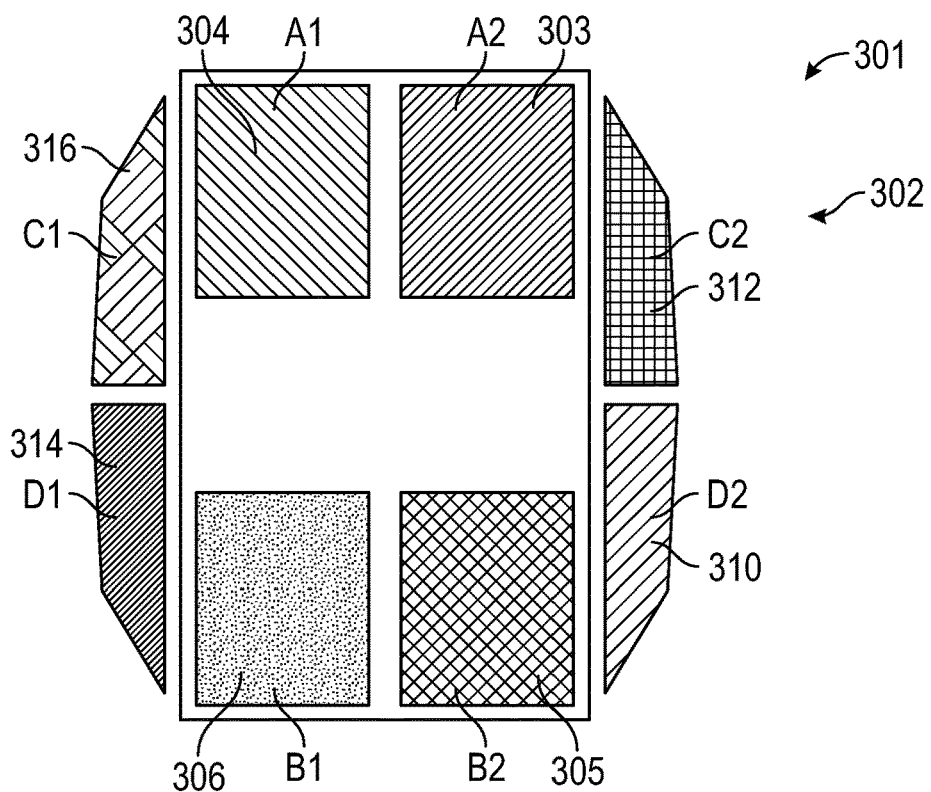
FIG. 6 shows a simplified view of the portion of FIG. 5.
Figure 7:
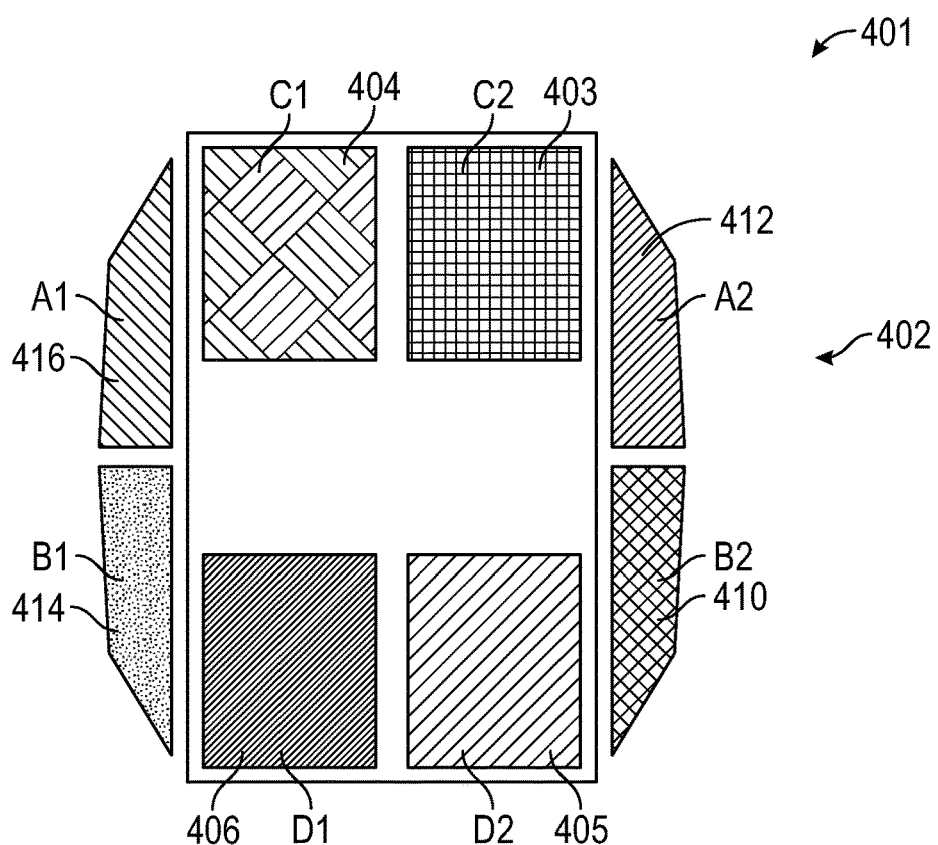
FIG. 7 shows a simplified view of a portion of another vehicle for use with the vehicle of FIG. 6.

FIG. 5 shows a portion of another vehicle 301, structured like the vehicles 101,201, such that like reference numbers represent like features. As shown, the interior 302 of the vehicle 301 has a number of seats 303,304,305,306, a number of display screens 310,312,314,316, and a number of cameras (only two of the cameras 320,322 are labeled in FIG. 5). The display screens 310,312 are coupled to a first side of the interior 302 of the vehicle 301, and the display screens 314,316 are coupled to a second, opposing side of the interior 302 of the vehicle 301 (e.g., opposing walls of the interior 302). FIG. 6 shows a simplified view of the vehicle 301 of FIG. 5, and FIG. 7 shows a simplified view of another vehicle 401, structured at least substantially the same as the vehicle 301. The vehicles 301,401 may be part of a communication system 300 (FIG. 8) like the communication system 100, discussed above.

As shown in FIGS. 6 and 7, the seats 303,304,305,306, 403,404,405,406 have been provided with position indicators A1,A2,B1,B2,C1,C2,D1,D2. Accordingly, positions A1,A2 are configured to present on the display screens 412,416, which are located on opposing sides of the interior 402 of the vehicle 401. Thus, individuals sitting in seats 303,304 can appear to be physically present in the vehicle 401 on opposing sides of the seats 403,404. Similarly, positions B1,B2 are configured to present on the display screens 410,414, which are located on opposing sides of the interior 402 of the vehicle 401. Thus, individuals sitting in seats 305,306 can appear to be physically present in the vehicle 401 on opposing sides of the seats 405,406. It will be appreciated that positions C1,C2,D1,D2 are similarly configured to present on display screens 310,312,314,316.

Stated differently, the display screen 310 is configured to display a representation of a first side of the vehicle 401 (e.g., proximate position D2), the display screen 314 is configured to display a representation of a second side of the vehicle 401 (e.g., proximate position D1), the display screen 410 is configured to display a representation of a first side of the vehicle 301 (e.g., proximate position B2), and the display screen 414 is configured to display a representation of a second side of the vehicle 301 (e.g., proximate position B1). The first side of the vehicle 301 (e.g., proximate position B2) corresponds to (e.g., is in the same structural position as, or is oriented in the same structural position with respect to vehicle components, including the engine, doors, and steering wheel) the first side of the vehicle 401 (e.g., proximate position D1). Similarly, the second side of the vehicle 301 (e.g., proximate position B2) corresponds to the second side of the vehicle 401 (e.g., proximate position D2).

Accordingly, even though in transit individuals sitting on the seats 303,304,305,306,403,404,405,406 are in separate physical spaces, the audio-visual link provided by the associated communication system makes it seem as though these individuals are all in the same physical space. Additionally, each of the display screens 310,312,314,316,410,412,414, 416 are configured to display life size representations of the interiors 302,402 such that, for example, a life size representation of an individual sitting on seat 303 will be displayed by the display screen 412. Moreover, audio may be provided via audio sensors (not shown) in the same manner as the audio sensors 111,113,211,213 provided audio to the communication system 100.

As such, audio sensors (not shown) may be coupled to the interior 302,402 of the vehicles 301,401 and positioned proximate a corresponding one of the display screens 310, 312,314,316,410,412,414,416 such that audio sensors in a first vehicle 301 may be wirelessly connected to audio sensors in a second vehicle 401. That is, first and second audio sensors in the vehicle 301 positioned proximate the display screens 312,316 may each be wirelessly connected to corresponding audio sensors in the vehicle 401 which are positioned proximate the display screens 412,416.

Figure 8:
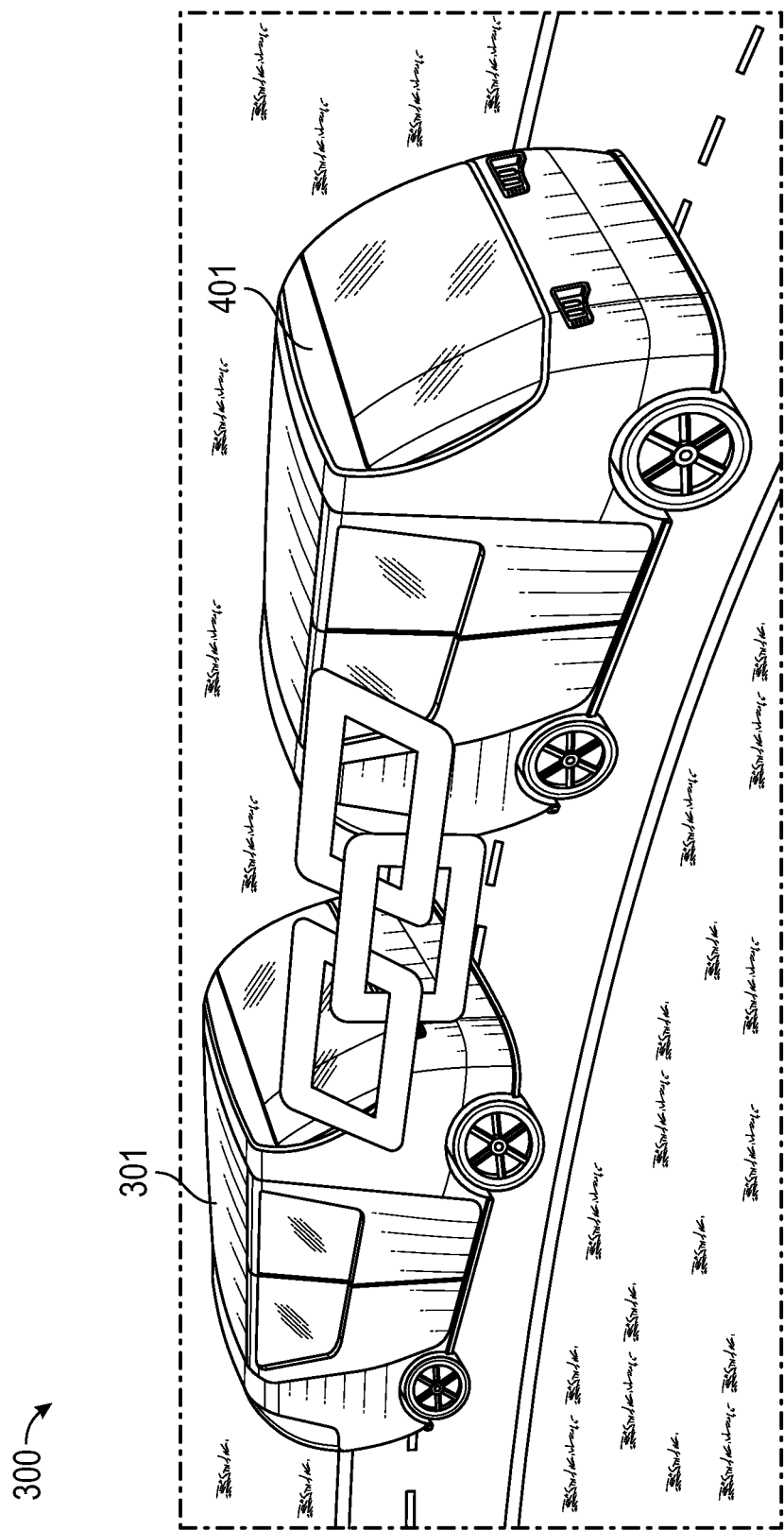
FIG. 8 shows the communication system employing the vehicles of FIGS. 6-7, and shows a rendering of a two-way audio-visual link, in accordance with embodiments of the disclosed concept.

FIG. 8 shows the communication system 300. As shown, there is a two-way audio-visual link between the vehicles 301,401. The link may be provided by an app on an external device. See, for example, the app 22 (FIG. 1) on the mobile phone 20 (FIG. 1).

Figure 9:
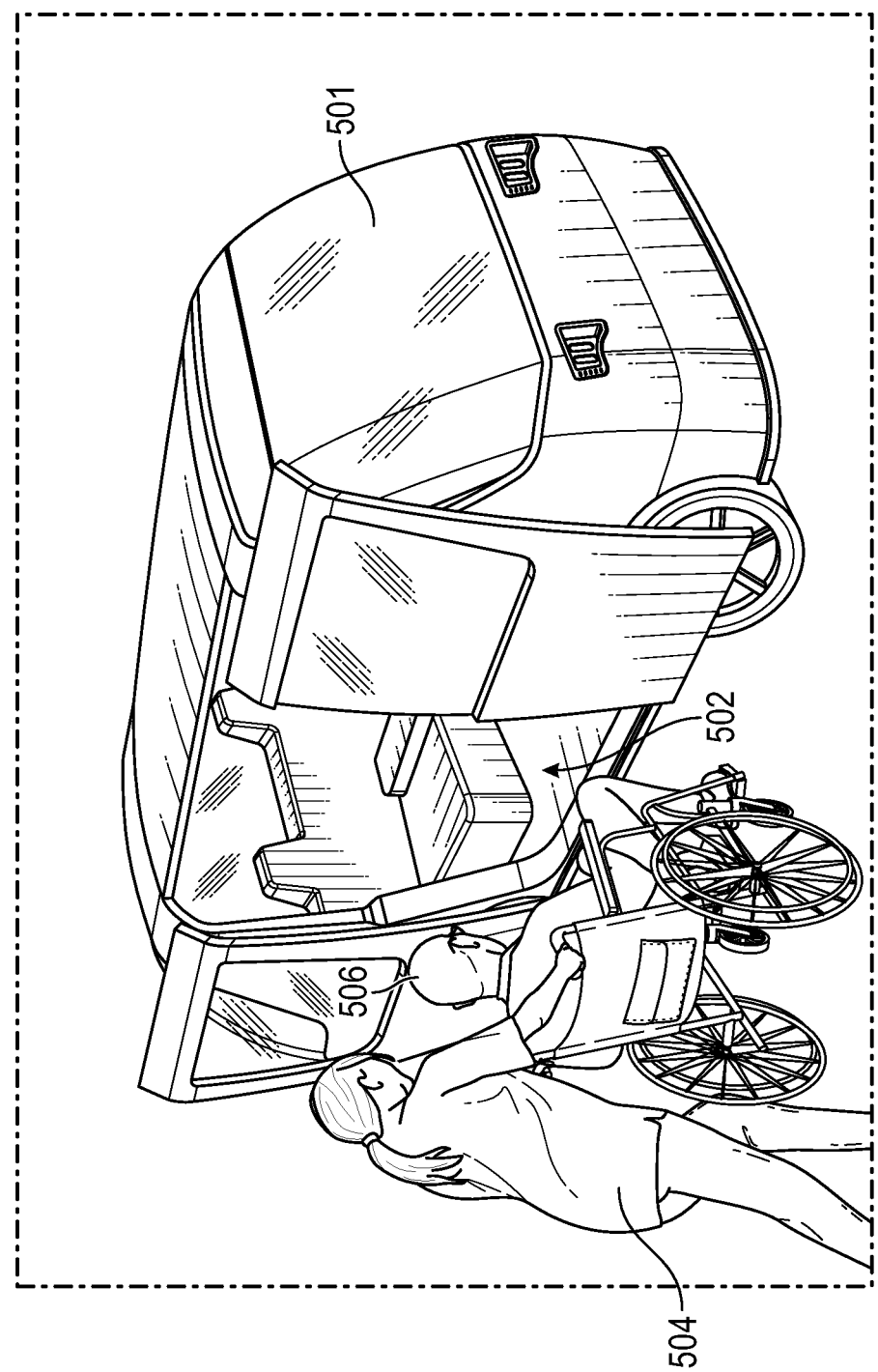
FIG. 9 shows a vehicle and a number of individuals, in accordance with another non-limiting embodiment of the disclosed concept.

FIG. 9 shows an additional scenario in which the disclosed concept may be employed. As shown, a woman 504 is wheeling an elderly man 506 into an interior 502 of a vehicle 501. This scenario may present, for example, when the man is being driven to a hospital for a doctor's appointment. In such a situation, for one reason or another the woman 504 might not be able to ride in the vehicle 501 with the man 506 to the hospital. However, in accordance with the disclosed concept, desirable communication is still possible between the woman 504 and the man 506 when the man 506 is being driven.

Figure 10:
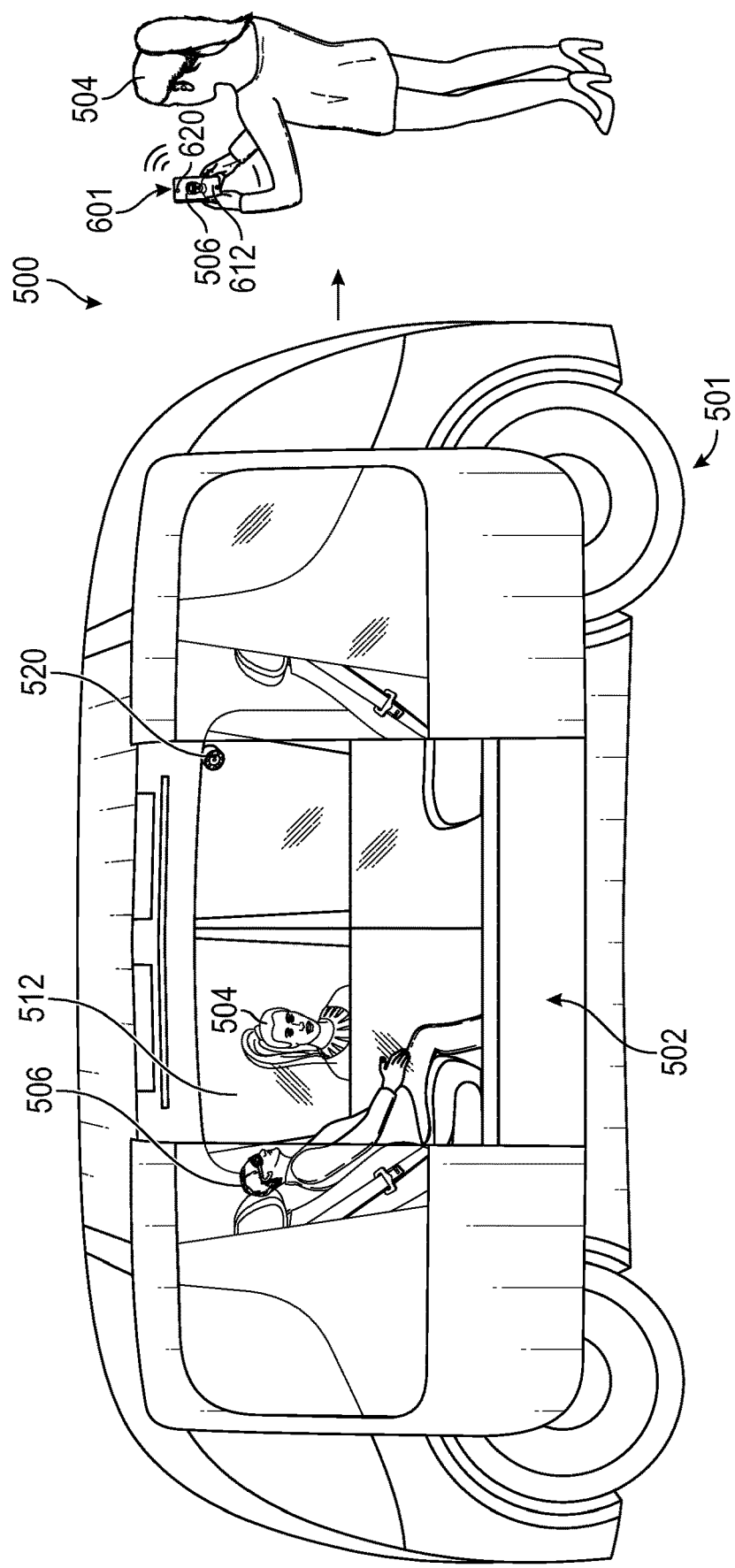
FIG. 10 shows a communication system employing the vehicle of FIG. 9.

More specifically, FIG. 10 shows an example communication system 500 including the vehicle 501 and an apparatus (e.g., mobile phone 601). As shown, the vehicle 501 includes a display screen 512 and a camera 520 each coupled to the interior 502 such that the vehicle 501 is structured similar to the vehicles 101,201,301,401, discussed above. Additionally, unlike the communication systems 100,300, discussed above, the other apparatus which is provided with a two-way audio-visual link with the vehicle 501 is the mobile phone 601, which includes a display screen 612 and a camera 620.

As such, the woman 504 shown in FIG. 10, who is positioned outside of the vehicle 501, can communicate with the man 506 who is inside the interior of the vehicle 501, and the man 506 can similarly communicate with the woman 504. See, for example, the life size representation of the woman 504 in the display screen 512, and the representation of the man 506 appearing on the display screen 612 of the mobile phone 601 of the woman 504. Similar to the communication systems 100,300, the audio-visual link which wirelessly connects the camera 520 to the display screen 612, and which wirelessly connects the camera 620 to the display screen 512, can be provided via an app on the mobile phone 601. It will also be appreciated that apparatus other than the mobile phone 601 can be employed to allow the woman 504 to communicate with the man 506 in the vehicle 501. For example, any computing device having a camera and audio system may be used.

Figure 11:
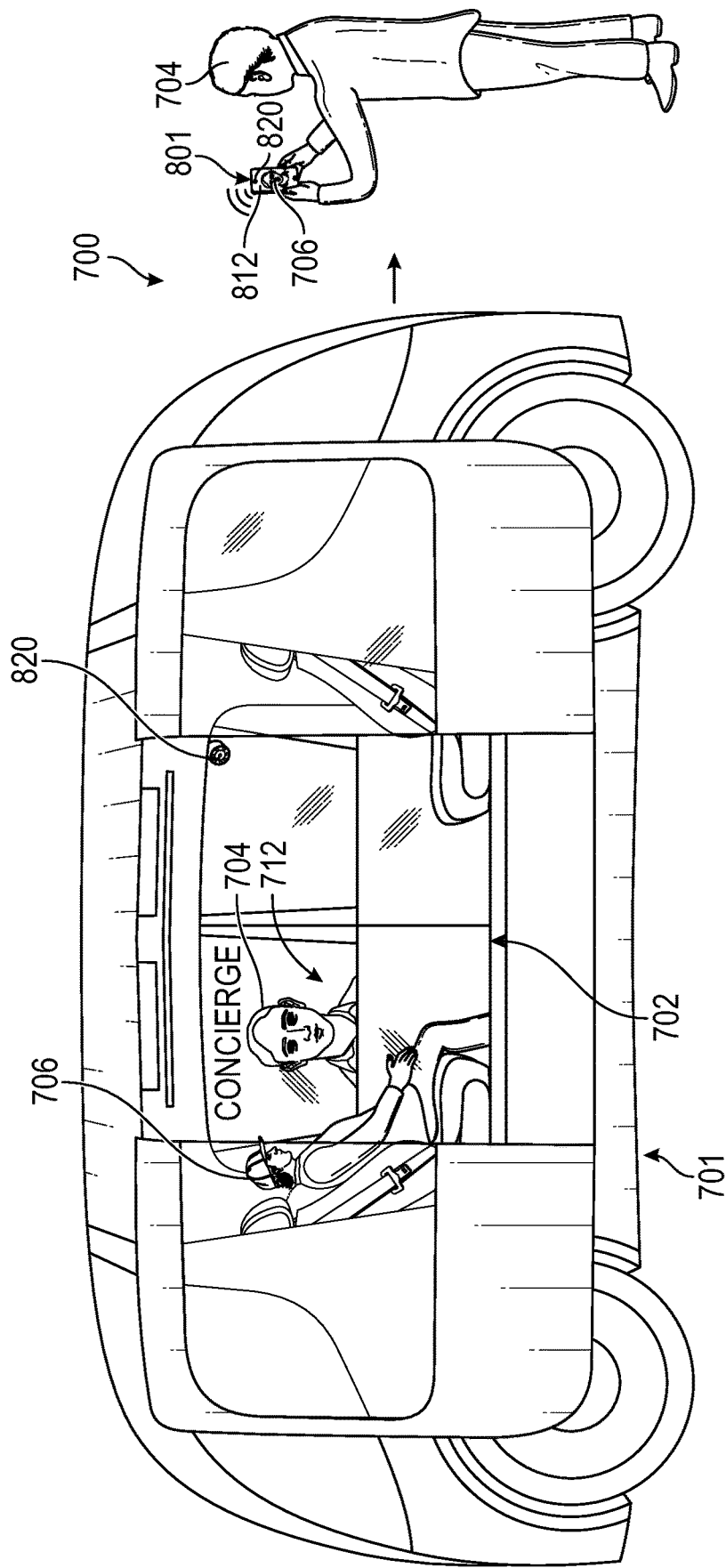
FIG. 11 shows another communication system, in accordance with another non-limiting embodiment of the disclosed concept.

FIG. 11 shows another scenario in which the disclosed concept may be employed. As shown, a communication system 700 is provided. The communication system 700 includes a vehicle 701 and an apparatus (e.g., without limitation, mobile phone 801). Furthermore, coupled to an interior 702 of the vehicle 701 is a display screen 712 and a camera 720. The mobile phone 801 also has a display screen 812 and a camera 820. The display screens 712,812 and the cameras 720,820 advantageously provide the communication system 700 with a link to enjoy communication.

It will also be appreciated that audio sensors (not shown) in the vehicle 701 and the mobile phone 801 allow for a two-way audio link to be provided by the communication system 700.

In one example embodiment, an individual operating the mobile phone 801 is a concierge 704. See, for example, the real-life concierge 704 standing outside the vehicle 701 in FIG. 11, and the life size representation of the concierge 704 in the display screen 712, talking to the individual 706 seated in the interior 702 of the vehicle 701. In this manner, individuals being transported in, for example, fully autonomous taxis, can enjoy the benefits of having a personal concierge, in substantially the same manner as if the concierge was physically present with them in the taxi.

Figure 12:
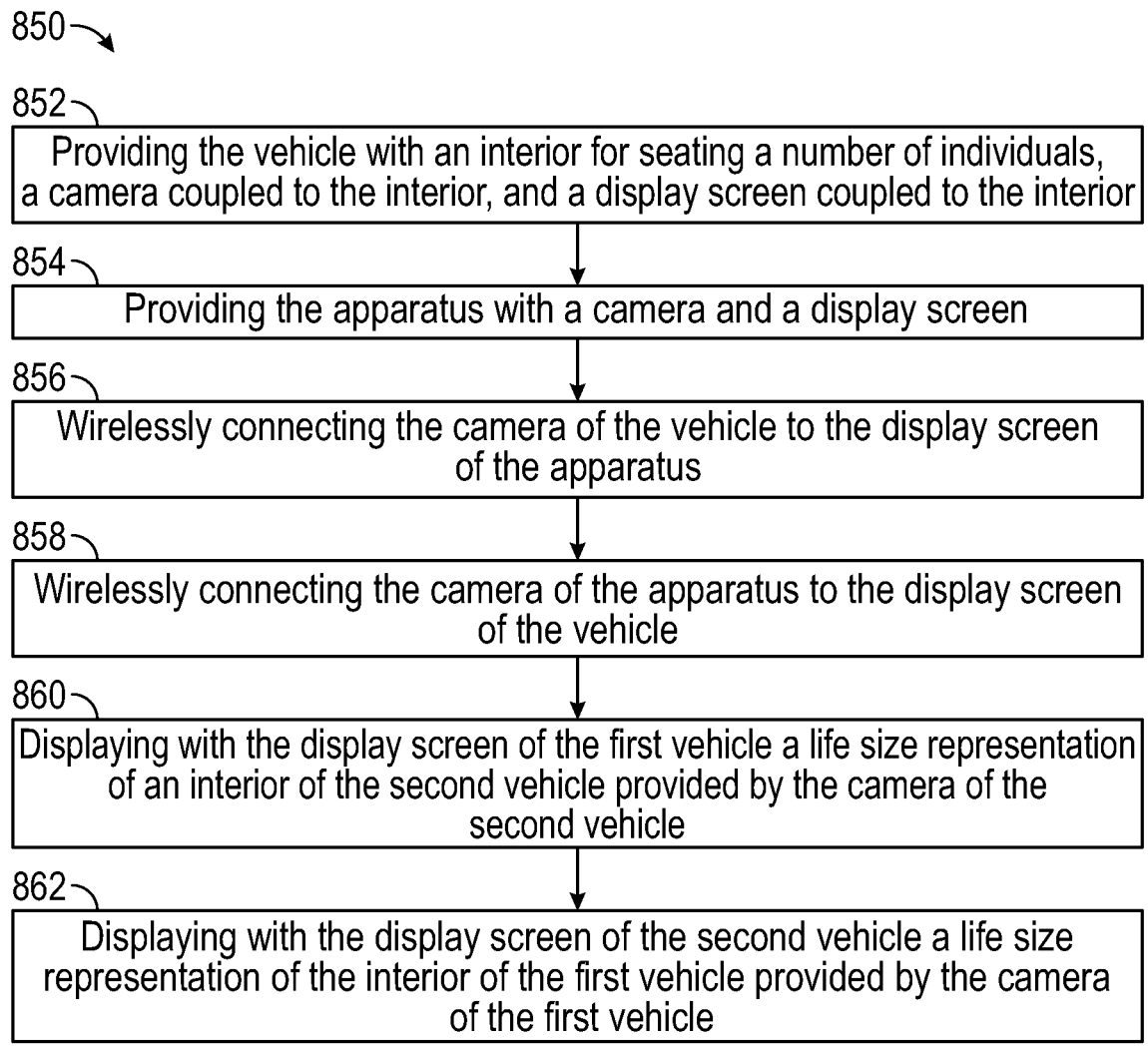
FIG. 12 is a flow diagram showing an example method, in accordance with another non-limiting embodiment of the disclosed concept.

FIG. 12 shows an example method 850 of providing communication between a vehicle 101,301,501,701 and an apparatus 201,401,601,801. The method 850 includes a first step 852 of providing the vehicle 101,301,501,701 with an interior 102,302,502,702 for seating a number of individuals, a camera 120,122,320,322,520,720 coupled to the interior 102,302,502,702, and a display screen 110,112,310,312, 314,316,512,712 coupled to the interior 102,302,502,702. The method 850 further includes a second step 854 of providing the apparatus 201,401,601,801 with a camera 220,222,620,820 and a display screen 210,212,410,412,414, 416,612,812, and a third step 856 of wirelessly connecting the camera 120, 122,320,322,520,720 of the vehicle 101, 301,501,701 to the display screen 210,212,410,412,414,416, 612,812 of the apparatus 201,401,601,801. The method 850 further includes a fourth step 858 of wirelessly connecting the camera 220,222,620,820 of the apparatus 201,401,601, 801 to the display screen 110, 112,310,312,314,316,512,712 of the vehicle 101,301,501,701, a fifth step 860 of displaying with the display screen 110,112,310,312,314,316,512,712 of the first vehicle 101,301,501,701 a life size representation of an interior of the second vehicle 202,402 provided by the camera 220,222 of the second vehicle 202,402, and a sixth step 862 of displaying with the display screen 210,212,410, 412,414,416 of the second vehicle 201,401 a life size representation of the interior 102,302 of the first vehicle 101,301 provided by the camera 120,122,320,322 of the first vehicle 101,301.

Accordingly, it will be appreciated that the disclosed concept provides for a new communication system 100,300, 500,700, vehicle 101,201,301,401,501,701 for use with the same, and associated method, in which two-way audio-visual communication is provided that advantageously allows individuals to be in separate spaces and enjoy communication as if they were in the same physical space.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A communication system, comprising:
   a first vehicle comprising an interior for seating a number of individuals, the first vehicle comprising:
      a first camera, a first audio sensor, and a first display screen that is coupled to a first side of the interior; and
      a second camera, a second audio sensor, and a second display screen that is coupled to a second side of the interior, wherein the second side of the interior is opposite to the first side;
   a second vehicle comprising:
      a third camera, a third audio sensor, and a third display screen that is coupled to a first interior side of the second vehicle; and
      a fourth camera, a fourth audio sensor, and a fourth display screen that is coupled to a second interior side of the second vehicle, wherein the second interior side is opposite to the first interior side, wherein the communication system is further configured to:
   cause the first vehicle to receive a first image from the second vehicle and display the first image on the first display screen;
   cause the first vehicle to receive a second image from the second vehicle and display the second image on the second display screen;
   cause the second vehicle to receive a third image from the first vehicle and display the third image on the third display screen; and
   cause the second vehicle to receive a fourth image from the first vehicle and display the fourth image on the fourth display screen.

2. The communication system according to claim 1, wherein the first display screen and the second display screen are configured to display a life size representation of an interior of the second vehicle; and wherein the third display screen and the fourth display screen is configured to display a life size representation of the interior of the first vehicle.

3. The communication system according to claim 1, wherein the first vehicle is a first fully autonomous taxi, and wherein the second vehicle is a second fully autonomous taxi.

4. The communication system according to claim 1, wherein the first display screen is configured to display a representation of a first side of the second vehicle, wherein the second display screen is configured to display a representation of a second side of the second vehicle, wherein the third display screen is configured to display a representation of a first side of the first vehicle, wherein the fourth display screen is configured to display a representation of a second side of the first vehicle, wherein the first side of the first vehicle corresponds to the first side of the second vehicle, and wherein the second side of the first vehicle corresponds to the second side of the second vehicle.

5. The communication system according to claim 1, wherein the first audio sensor and second audio sensor are each coupled to the interior of the first vehicle and positioned proximate a corresponding one of the first and the second display screens, wherein third audio sensor and the fourth audio sensor are each coupled to an interior of the second vehicle and positioned proximate a corresponding one of the third and the fourth display screens, and wherein each of the first and second audio sensors are wirelessly connected to a corresponding one of the third and fourth audio sensors.

6. A method of providing communication between a first vehicle and a second vehicle, the method comprising:
   providing the first vehicle with an interior for seating a number of individuals, a first camera coupled to the interior, a first display screen coupled to a first side of the interior of the first vehicle, a second camera and a second display screen coupled to a second side of the interior of the first vehicle;

providing the second vehicle with a third camera and a third display screen coupled to a third side of an interior of the second vehicle and a fourth camera and a fourth display screen coupled to a fourth side of the interior of the second vehicle;

wirelessly connecting the first camera of the vehicle to the third display screen of the second vehicle; and the second camera to the fourth display screen of the second vehicle;

wirelessly connecting the third camera of the second vehicle to the first display screen of the first vehicle and the fourth camera of the second vehicle to the second display screen of the first vehicle;

displaying, on the first display screen, a life size representation of a first portion of the interior of the second vehicle as captured by the third camera;

displaying, on the second display screen, a life size representation of a second portion of the interior of the second vehicle as captured by the fourth camera;

displaying, on the third display screen, a life size representation of a first portion of the interior of the first vehicle as captured by the first camera; and displaying, on the second display screen, a life size representation of a second portion of the interior of the second vehicle as captured by the fourth camera.

7. The method according to claim 6, wherein the first and the sides of the interior of the first vehicle are opposite to each other, and wherein the third and the fourth sides of the interior of the second vehicle are opposite to each other.

8. The communication system according to claim 1, wherein:
the first display screen is positioned proximate to a first seating position in the interior of the first vehicle;
the second display screen is positioned proximate to a second seating position in the interior of the first vehicle;
the third display screen is positioned proximate to a third seating position in an interior of the second vehicle; and
the fourth display screen is positioned proximate to a fourth seating position in the interior of the second vehicle.

9. The communication system according to claim 8, wherein:
the first display screen is configured to display a life size representation of a first person seated in the third seating position in the second vehicle;
the second display screen is configured to display a life size representation of a second person seated in the fourth seating position in the second vehicle;
the third screen is configured to display a life size representation of a third person sitting in the first seating position in the first vehicle; and
the fourth screen is configured to display a life size representation of a fourth person sitting in the second seating position in the first vehicle.

10. The communication system according to claim 1, wherein the first vehicle further comprises:

a fifth camera, a fifth audio sensor, and a fifth display screen that is coupled to the first side of the interior; and
a sixth camera, a sixth audio sensor, and a sixth display screen that is coupled to the second side of the interior, wherein the first display screen and the fifth display screen are adjacent to each other and the second display screen and the sixth display screen are adjacent to each other.

11. The method of claim 6, wherein the first display screen, the first camera and the first audio sensor are located proximate to a first seating position in the interior of the first vehicle; and the second camera, the second display screen, and the second audio sensor are located proximate to a second seating position in the interior of the first vehicle, wherein the first seating position is opposite the second seating position.

12. The method of claim 11, wherein the first display screen is positioned laterally adjacent to the second display screen.

13. A vehicle comprising:
an interior defining a plurality of seating positions;
a first camera, a first audio sensor and a first display screen coupled to a first portion of a first side of the interior;
a second camera, a second audio sensor and a second display screen coupled to a second portion of the first side of the interior, wherein the second portion is adjacent to the first portion;
a wireless interface configured to communicate with a second vehicle;
wherein the vehicle is operable to:
establish a first communication channel between the first display screen and a third camera of the second vehicle;
establish a second communication channel between the second display screen and a fourth camera of the second vehicle;
establish a third communication channel between the first camera and a third display screen of the second vehicle;
receive a first image from the third camera and display the first image on the first screen;
receive a second image from the fourth camera and display the second image on the second display screen;
capture, using the first camera, a third image of a portion of the interior of the first vehicle; and
cause the second vehicle to display the third image on the third display screen.

14. The vehicle of claim 13, wherein the first display screen is positioned proximate to a first seating position and the second display screen in positioned proximate to a second seating position.

15. The vehicle of claim 14, wherein the first seating position is opposite to the second seating position.

* * * * *